United States Patent [19]

Taga et al.

[11] Patent Number: 4,602,696
[45] Date of Patent: Jul. 29, 1986

[54] CONTROL SYSTEM FOR SELECTIVELY SWITCHABLE TWO/FOUR WHEEL DRIVE AUTOMATIC TRANSMISSION SYSTEM PROVIDING SHIFTING CHARACTERISTIC MATCHED TO DRIVING CONDITION

[75] Inventors: Yutaka Taga; Shinya Nakamura, both of Toyota; Yoichi Hayakawa, Anjo, all of Japan

[73] Assignees: Toyota Jidosha Kabushiki Kaisha, Toyota; Aisin-Warner Limited, Anjo, both of Japan

[21] Appl. No.: 742,304

[22] Filed: Jun. 7, 1985

[30] Foreign Application Priority Data

Jun. 12, 1984 [JP] Japan .................. 59-120239

[51] Int. Cl.[4] .................. B60K 17/34
[52] U.S. Cl. .................. 180/247; 180/233
[58] Field of Search .................. 180/75.1, 247, 248, 180/249, 233

[56] References Cited

U.S. PATENT DOCUMENTS 4,422,349 12/1983 Matsumoto et al. .................. 180/247
4,444,073 4/1984 Moroto et al. .................. 180/247
4,503,927 3/1985 Hayakawa et al. .................. 180/247

Primary Examiner—John J. Love
Assistant Examiner—Donn McGiehan
Attorney, Agent, or Firm—Oblon, Fisher, Spivak, McClelland & Maier

[57] ABSTRACT

A transmission for a vehicle has a main transmission system which can be set to any one of a plurality of speed stages, and a transfer transmission system which receives power from the main transmission system and can be selectively set either to a two wheel drive operational mode or a four wheel drive operational mode. A transmission control system for this transmission incorporates a means for detecting at least one parameter representing the operational condition of the vehicle, a means for determining the operational mode of the transfer transmission system, and a means for automatically setting the main transmission system to selected ones of the plurality of speed stages thereof according to the parameter representing the operational condition of the vehicle, and also according to the operational mode of the transfer transmission system, wherein the pattern of shifting between the plurality of speed stages of the main transmission system according to the parameter is varied, according as the transfer transmission system is set to the two wheel drive operational mode or the four wheel drive operational mode.

13 Claims, 8 Drawing Figures

CONTROL SYSTEM FOR SELECTIVELY SWITCHABLE TWO/FOUR WHEEL DRIVE AUTOMATIC TRANSMISSION SYSTEM PROVIDING SHIFTING CHARACTERISTIC MATCHED TO DRIVING CONDITION

BACKGROUND OF THE INVENTION

The present invention relates to the field of control of vehicle transmissions which are switchable between two wheel drive operation and four wheel drive operation, and in particular to the field of such control systems which operate automatically to switch the transmissions between a plurality of speed stages according to vehicle operational conditions.

Automatic transmissions for vehicles are per se known: such an automatic transmission provides one or the other of various speed stages (i.e. gearing ratios) between the vehicle engine and the wheels thereof, according to various operational conditions of the vehicle such as engine load and vehicle road speed, as well as according to the set position of a manual range setting means such as a lever which is set by the driver to one of several operational ranges such as "D" range, "2" range, and "L" range. The switching pattern between these speed stages is typically described by a shift pattern diagram.

Now, recently vehicles which can be optionally switched between a two wheel drive mode of operation and a four wheel drive mode have become more and more popular. Such a vehicle typically incorporates in its power train, typically after the main transmission unit thereof, a transfer transmission unit which can be switched either to provide power to the rear wheels only of the vehicle or to provide power to all the four wheels of the vehicle.

It might be conceived of to combine these two forms of transmission, in other words, to make the main transmission of such a two/four wheel drive type of vehicle be an automatic transmission unit. However, because the vehicle running characteristics are very much different between the four wheel drive operational mode of the vehicle and the two wheel drive operation mode, this has not heretofore been practicable, because a shifting characteristic for such a main transmission unit which has been suitable for use during two wheel drive operation has been quite unsuitable during four wheel drive operation, and vice versa. Accordingly up till now it has been effectively impracticable to apply an automatic transmission to a dual two/four wheel drive type of vehicle.

SUMMARY OF THE INVENTION

Accordingly, it is the primary object of the present invention to provide a control system for an automatic transmission system including a selectively actuatable two/four wheel drive transfer transmission, which obviates the above outline problem.

It is a further object of the present invention to provide such a transmission control system for such an automatic transmission, which can cause the transmission to operate well both in the four wheel drive operational mode and in the two wheel drive operational mode.

It is a further object of the present invention to provide such a transmission control system for such an automatic transmission, which can adjust the shift points of the main transmission, according as to whether the transfer transmission is set to the four wheel drive operational mode or to the two wheel drive operational mode.

It is a further object of the present invention to provide such a transmission control system for such an automatic transmission, which can adjust the lock up points of the main transmission, according as to whether the transfer transmission is set to the four wheel drive operational mode or to the two wheel drive operational mode.

It is a yet further object of the present invention to provide such a transmission control system for such an automatic transmission, which can provide good vehicle operability and drivability in all operational modes.

According to the most general aspect of the present invention, these and other objects are accomplished by, for a transmission system, for a vehicle with at least four wheels, comprising a main transmission system which can be set to any one of a plurality of speed stages, and a transfer transmission system which receives power from said main transmission system and can be selectively set either to a two wheel drive operational mode in which it provides transmission of power only to two wheels of said vehicle or to a four wheel drive operational mode in which it provides transmission of power to four wheels of said vehicle: a transmission control system, comprising: (a) a means for detecting at least one parameter representing the operational condition of the vehicle; (b) a means for determining the operational mode of said transfer transmission system between said two wheel drive operational mode and said four wheel drive operational mode; and (c) a means for setting said main transmission system to selected ones of said plurality of speed stages thereof according to said parameter representing the operational condition of the vehicle as detected by said detecting means therefor, and according to the operational mode of said transfer transmission system as determined by said determining means therefor, a pattern of shifting between said plurality of speed stages of said main transmission system as said parameter varies varying according as said transfer transmission system is set to said two wheel drive operational mode or said four wheel drive operational mode; or alternatively by, for a transmission system, for a vehicle with at least four wheels, comprising a main transmission system which can be set to any one of a plurality of speed stages and including a torque converter and a lock up clutch which selectively can lock up said torque converter, and a transfer transmission system which receives power from said main transmission system and can be selectively set either to a two wheel drive operational mode in which it provides transmission of power only to two wheels of said vehicle or to a four wheel drive operational mode in which it provides transmission of power to four wheels of said vehicle: a transmission control system, comprising: (a) a means for detecting at least one parameter representing the operational condition of the vehicle; (b) a means for determining the operational mode of said transfer transmission system between said two wheel drive operational mode and said four wheel drive operational mode; and (c) a means for setting said main transmission system to selected ones of said plurality of speed stages thereof, and for either locking up said torque converter or not, according to said parameter representing the operational condition of the vehicle as detected by said detecting means therefor, and according to the operational mode of said transfer transmission system as determined by said determining means therefor, the pattern of shifting between said plurality of speed stages of said main transmission system and of torque converter locking up as said parameter varies varying according as said transfer transmission system is set to said two wheel drive operational mode or said four wheel drive operational mode.

According to such a structure, the operational characteristics of the main transmission can be set to be optimal when the transfer transmission is set to the two wheel drive mode, and also to be optimal when the transfer transmission is set to the four wheel drive operational mode; and thereby it is for the first time made to be practically possible to perform automatic speed stage transmission in the vehicles of the type which can be optionally switched between the two wheel drive mode of operation and the four wheel drive mode of operation, reasonably conserving fuel and providing maximum power when required. Further, with lock up clutch engagement data being dependent on the setting of the transfer transmission, it is also made possible to incorporate a lock up clutch in the automatic transmission, further to improve the performance thereof.

BRIEF DESCRIPTION OF THE DRAWINGS

The present invention will now be shown and described with reference to the preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and spaces and so on are denoted by like reference symbols in the various figures thereof; in the description, spatial terms are to be everywhere understood in terms of the relevant figure; and:

DESCRIPTION OF THE PREFERRED EMBODIMENT

Figure 1:
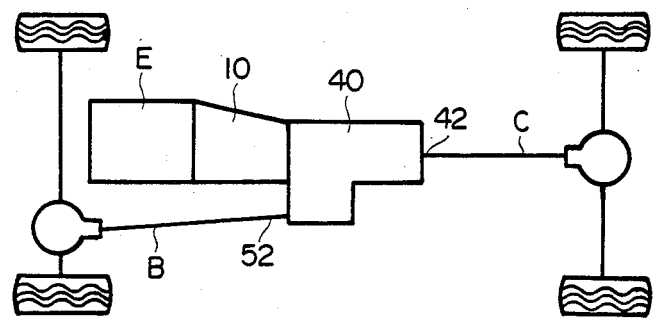
FIG. 1 is a schematic block diagrammatical plan view of the power train of an automotive vehicle, said power train incorporating a transmission system which is capable of providing either two wheel drive or four wheel drive operation, and which is the preferred embodiment of the present invention.
Figure 2:
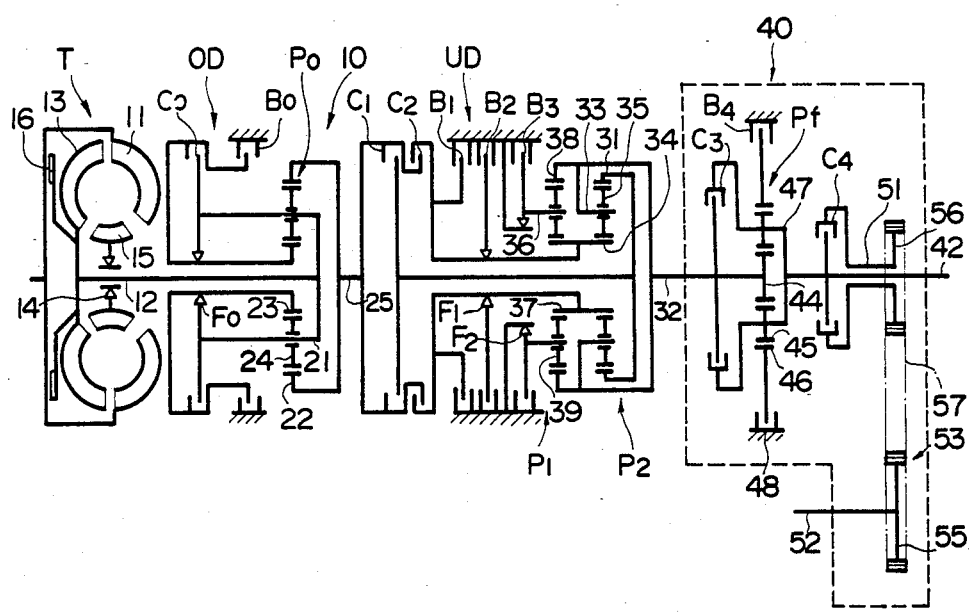
FIG. 2 is a schematic skeleton view of the major rotational power transmitting components of said transmission system.

The present invention will now be described with reference to the preferred embodiment thereof, and with reference to the figures. FIG. 1 is a schematic plan view of the power train of a four wheel drive type automotive vehicle, and FIG. 2 is a schematic skeleton view showing the major rotational power transmitting components of a transmission system incorporated in said power train which is said preferred embodiment of the present invention.

Referring first to FIG. 1 in which the various power train elements are shown merely as blocks, the reference symbol E denotes the engine of the automotive vehicle, and this engine E is coupled to and provides rotational power to a main transmission unit 10 which is an automatic transmission and has a plurality of speed stages, including an overdrive speed stage, which are selectively engaged according to operational conditions of the automotive vehicle as will be described in detail hereinafter. The rotational power output of this main transmission 10 is supplied to a transfer transmission unit 40 which is selectively set to operate in a two wheel drive mode or a four wheel drive mode. As will also be explained in detail hereinafter: when said transfer transmission 40 is set to its four wheel drive mode, then it supplies output rotational power both to a rear power output shaft 42, which is rotationally connected via a rear propeller shaft C and a rear differential unit to the rear wheels of the vehicle, and also to a front power output shaft 52, which is rotationally connected via a front propeller shaft B and a front differential unit to the front wheels of the vehicle; while on the other hand, when said transfer transmission 40 is set to its two wheel drive mode, then it supplies output rotational power in said manner via its rear power output shaft 42 to the rear wheels of the vehicle, only, but does not supply any output rotational power via its front power output shaft 52 to the front wheels.

Referring next to the skeleton view of FIG. 2, the operation of the gear trains of the abovementioned main transmission 10 and transfer transmission 40 will be explained.

The main transmission 10 comprises, in the order of power transmission, a fluid torque converter T, an overdrive unit OD, and an underdrive unit UD; thus, each of these units drives the next one. The fluid torque converter T provides, in a per se known fashion, a torque amplification and a fluid clutch function; the overdrive unit OD can be selectively set by means which will be explained hereinafter either to a direct connection mode or to an overdrive mode; and the underdrive unit UD can be selectively set by means which also will be explained hereinafter to any one of three forward speed stages and one reverse speed stage.

In detail, the torque converter T comprises a pump impeller 11 which is rotationally driven by the power output shaft of the engine E via a power input shaft, a driven turbine member 13 which is rotationally coupled to the power output shaft 12 of the torque converter T, and a stator member 15 which is rotatably mounted to the casing of the torque converter T via a one way clutch 14. In a per se known manner, by circulation of hydraulic fluid (which fills the casing of the torque converter T) around a toroidal path defined by the pump impeller 11, the driven turbine 13, and the stator member 15 in the manner of a smoke ring, the pump impeller 11 is rotationally coupled to the driven turbine member 13 with a certain amount of torque amplification and slippage being provided therebetween, and thus the power input shaft of the torque converter T is rotationally coupled to its power output shaft 12. A direct clutch 16 is also incorporated for selectively, again in a per se known manner, when actuated to be engaged, providing a direct connection between the pump impeller 11 and the driven turbine 13. The power output shaft 12 of the torque converter T also serves as a power input shaft for the overdrive device OD.

The overdrive device OD comprises a multi plate clutch C0 and a multi plate brake B0, both of which are per se known friction engaging mechanisms which selectively are actuated by selective supply of pressurized hydraulic fluid to their pressure chambers (not particularly shown), and also comprises a one way clutch F0 and a planetary gear mechanism P0, and by such selective actuation of the clutch C0 and the brake B0 either provides direct connection between its power input shaft 12 and its power output shaft 25, or provides a speed increasing function therebetween. In detail, the power input shaft 12 is connected to a carrier 21 of the planetary gear mechanism P0, and this planetary gear mechanism P0 also has a ring gear 22 which is rotationally connected to the power output shaft 25, a sun gear 23, rotatably mounted on the power input shaft 12, which is selectively coupled to the casing of the overdrive device OD via the brake B0, and a plurality of planetary pinions 24 which are rotatably mounted to the carrier 21 and which are meshed with the ring gear 22 and the sun gear 23 and perform planetary movement therebetween in a per se known way. And, further, the sun gear 23 and the carrier 21 are selectively coupled together via the clutch C0, and are also, in one rotational direction only, always coupled together via the one way clutch F0. This gear train operates, according to selective actuation of the clutch C0 and the brake B0, in a manner which will be clear to one of ordinary skill in the relevant art based upon the descriptions given herein and hence will not be elaborated upon in detail.

The power output shaft 25 of the overdrive device OD also serves as a power input shaft for the underdrive device UD. The underdrive device UD comprises multi plate clutches C1 and C2 and multi plate brakes B1, B2 and B3, all of which again are per se known friction engaging mechanisms which selectively are actuated by selective supply of pressurized hydraulic fluid to their pressure chambers (not particularly shown), and also comprises one way clutches F1 and F2 and planetary gear mechanisms P1 and P2 respectively for forward and for reverse; and by selective actuation of the clutches C1 and C2 and the brakes B1 through B3 the underdrive device UD either provides a (forward) direct connection between its power input shaft 25 and its power output shaft 32, or provides a forward speed decreasing function therebetween, or provides a reverse speed decreasing function therebetween. In detail, the power input shaft 25 is connected via the clutch C1 and an intermediate shaft to a ring gear 31 of the reverse planetary gear mechanism P2, and this mechanism P2 also has: a carrier 33 which is connected to the power output shaft 32 and to the ring gear 38 of the other forward planetary gear mechanism P1, a sun gear 34, rotatably mounted on the aforementioned intermediate shaft, which is selectively coupled to the casing of the underdrive device UD via the brake B1 and also is (in parallel) selectively coupled in one rotational direction only to said casing via the one way clutch F2 and the brake B2, as well as being selectively coupled to the power input shaft 25 via the clutch C2, and a plurality of planetary pinions 35 which are rotatably mounted to the carrier 33 and which are meshed with the ring gear 31 and the sun gear 34 and perform planetary movement therebetween in a per se known way. And, further, the sun gear 34 is integrally formed with a sun gear 37 for said other forward planetary gear mechanism P1, which further, as well as the aforementioned ring gear 38 which is as mentioned coupled to the power output shaft 32, has a carrier 36 which is selectively coupled via the brake B3 to the casing of the underdrive unit UD and is also always coupled in one rotational direction only to said underdrive unit casing via the one way clutch F1. And, again, a plurality of planetary pinions 39 incorporated in this forward planetary gear mechanism P1 are rotatably mounted to its carrier 36 and are meshed with its ring gear 38 and its sun gear 34 and perform planetary movement therebetween in a per se known way. This gear train operates, according to selective actuation of the clutches C1 and C2 and the brakes B1 through B3, in a manner which will be clear to one of ordinary skill in the relevant art based upon the descriptions given herein and hence will not be elaborated upon in detail.

Taken together, therefore, the combined function of the overdrive unit OD and the underdrive unit UD both described above, is that: according to selective engagement of the clutches C0 through C2 and the brakes B0 through B3 by a control system 100 which will be described hereinafter, according to the combinations as shown in Table 1 which is given at the end of this specification and before the claims thereof, there are provided in various speed ranges, in toto, four forward speed stages (one of which is an overdrive speed stage) and one reverse speed stage. (In this Table 1, the symbol "O" with reference to a clutch or a brake denotes engagement, while the symbol "X" denotes disengagement; and, with reference to a one way clutch, the symbol "L" denotes locking up so as to transmit torque, while the symbol "F" denotes free running). And, by the operation of this control system as will be explained later, these four forward speed stages are switched between automatically, according to the operational conditions of the vehicle such as road speed, engine load, and so on, and according to the particular forward speed range such as "D", "S", or "L" set by the position of a manual range setting valve 210 which will be described later, while the reverse speed stage is engaged, only, when said range setting valve is manually set to an "R" range.

The power output shaft 32 of the underdrive device UD also serves as a power input shaft for the transfer transmission 40. This transfer transmission 40 has a planetary gear mechanism Pf associated with a clutch C3 and a brake B4 both of the same selectively actuatable types as outlined previously, and further has another clutch C4 for selective provision of four wheel drive operation. In detail, the power input shaft 32 is connected to a sun gear 44 of the planetary gear mechanism Pf, and is also connected via the clutch C3 to a carrier 47 thereof and to the previously mentioned power output shaft 42 for the rear wheels of the vehicle, which is coaxial with said power input shaft 32 and extends out to the outside of the transmission 40, towards the rear of the vehicle. And a ring gear 46 of the planetary gear mechanism Pf is selectively connected via the brake B4 to the casing of this transmission 40, while, as before, a plurality of planetary pinions 45 incorporated in this planetary gear mechanism Pf are rotatably mounted to the carrier 47 and are meshed with the ring gear 46 and the sun gear 44 and perform planetary movement therebetween in a per se known way. On the power output shaft 42 for the rear wheels there is rotatably fitted a sleeve 51 with which a sprocket 56 is integrally formed, and this sleeve 51 and sprocket 56 are selectively rotationally couplable to said shaft 42 by the aforementioned clutch C4. The front wheel power output shaft 52 is rotatably fitted in the casing of the transfer transmission 40 and extends therefrom in the opposite direction to that of the shaft 42, in other words towards the front of the vehicle. On this shaft 52 there is fitted by splines or the like a sprocket 55, and an endless chain 57 is fitted around the sprockets 56 and 55 and provides transmission of rotation power therebetween. Thus, this sprocket and chain drive mechanism and the clutch mechanism C4 constitute a selectably engagable transmission system 53 for selectively driving the front wheels of the vehicle. The mechanism for thus selectively engaging the clutch C4 will be explained hereinafter.

Figure 3:
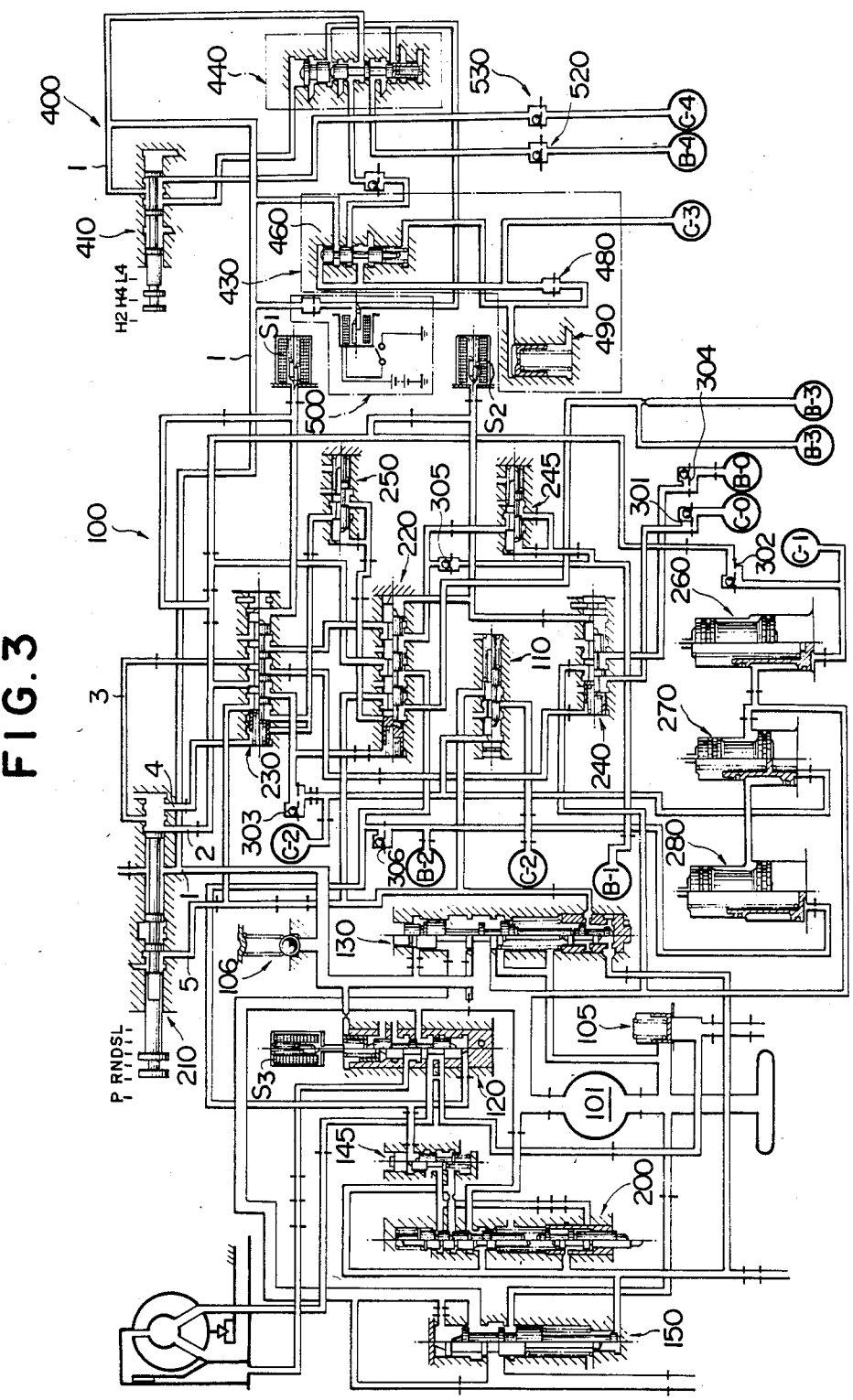
FIG. 3 is a general hydraulic circuit diagram of a hydraulic fluid pressure control system for the transmission system of FIG. 2.

Next, referring to the general hydraulic circuit diagram thereof shown in FIG. 3, the hydraulic fluid pressure control system 100 for the combination of the overdrive unit OD and the underdrive unit UD will be explained. This control system 100 comprises a hydraulic fluid pump 101 which sucks up and pressurizes hydraulic fluid from a sump, not shown. Further, the control system 100 comprises a first regulator valve 130, a second regulator valve 150, a cooler bypass valve 105, a pressure relief valve 106, a reverse clutch sequence valve 110, a throttle pressure control valve 200 which produces an output hydraulic fluid pressure which is indicative of throttle opening of the engine E—i.e. of the load on said engine E, a cut back valve 145, a direct clutch control valve 120, a manual range setting valve 210 which can be manually set by the hand of the driver of the automotive vehicle to any one of "P" or park range, "R" or reverse range, "N" or neutral range, "D" or drive range, "S" or second range and "L" or low range (as shown in Table 1), a first/second speed shift valve 220, a second/third speed shift valve 230, and a third/fourth speed shift valve 240. A solenoid valve S1 controls the first/second speed shift valve 220 and the third/fourth speed shift valve 240, another solenoid valve S2 controls the second/third speed shift valve 230, and a third solenoid valve S3 controls the direct clutch control valve 120. An intermediate coast modulator valve 245 is provided for adjusting the pressure supply to the servo unit B-1 of the brake B1, a low coast modulator valve 250 is provided for adjusting the pressure supply to the servo unit B-3 of the brake B3, an accumulator 260 is provided for adjusting the pressure supply to the servo unit C-1 of the clutch C1, an accumulator 270 is provided for adjusting the pressure supply to the servo unit C-2 of the clutch C2, an accumulator 280 is provided for adjusting the pressure supply to the servo unit B-2 of the brake B2, and flow control valves fitted with check valves and respectively denoted by the symbols 301, 302, 303, 304, 305, and 306 control the supplies of hydraulic fluid pressure to the respective servo units C-0, C-1, C-2, B-0, B-1, and B-2 of the clutches and brakes C0, C1, C2, B0, B1, and B2, respectively. Further, various hydraulic conduits including conduits 1 through 5 which communicate to the manual range setting valve 210, as shown in the figure, interconnect these various elements and chambers thereof, so as to communicate the hydraulic chambers of the servo units of the various friction engaging devices (the clutches and brakes) via various chambers of the various valves to be either supplied with hydraulic fluid pressure or to be drained, according as the various valves are positioned at their various positions; the details will easily be supplemented by one of ordinary skill in the transmission art, based upon the disclosure herein and upon the figure. The solenoids S1, S2, and S3 are selectively either energized or not energized by an electrical control system not shown in FIG. 3, according to the current values of various operational parameters of the vehicle such as road speed and engine load, and according to the set position of the manual range setting valve 210. Table 2, which again is given at the end of this specification and before the claims thereof, shows the state of communication or discommunication with the conduit 1 of each of the conduits 2 through 5, in each of the set ranges of the manual range setting valve 210. In this table, the symbol "O" denotes communication with the conduit 1, while the symbol "X" denotes discommunication therewith.

Figure 4:
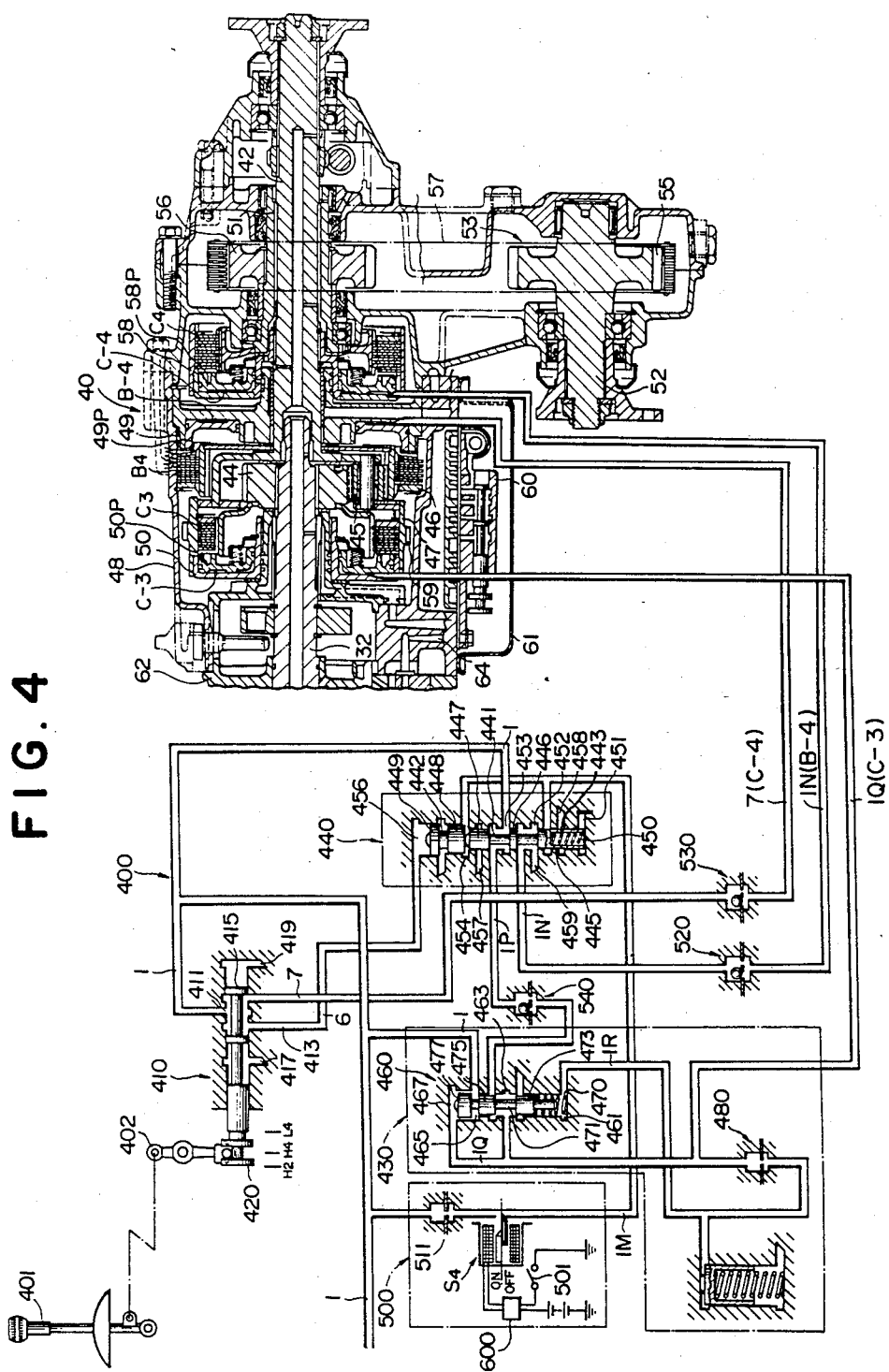
FIG. 4 is a detailed view of a part of said hydraulic fluid pressure control system, and also shows the constructional details of a transfer transmission unit which is schematically shown in FIG. 2.

Next, referring to the particular hydraulic circuit diagram thereof shown in FIG. 4, which is an enlarged portion of the general circuit shown in FIG. 3, the hydraulic fluid pressure control system 400 for the transfer transmission 40 will be explained. A particular possible construction for this transfer transmission 40 is also shown in FIG. 4. This transmission 40 comprises the elements described earlier, which are structurally shown in FIG. 4: the brake B4 is a multiplate friction brake which selectively engages the ring gear 46 to the case 48 of the transmission, and its servo unit B-4 comprises a cylinder 49 formed in the case 48 and a piston 49P. The clutch C3 is a multiplate friction clutch which is fitted on the transmission 10 side of the planetary gear mechanism Pf, and either connects together the sun gear 44 and the carrier 47 or not; its servo unit C-3 comprises a cylinder 50 coupled to the carrier 47 and a piston 50P reciprocating in the cylinder 50. The clutch C4 is a multiplate friction clutch and either connects together the output shaft 42 for the rear wheels of the vehicle which is coupled to the carrier 47, and the sleeve 51 which is coupled to the sprocket 56 at one end of the transfer transmission 53 for driving the output shaft 52 for the front wheels of the vehicle, or not; its servo unit C-4 comprises a cylinder 58 rotatably supported by the case 48 and a piston 58P reciprocating in the cylinder 58. The transfer transmission 53 comprises the sprocket 56 which is formed on the sleeve 51, the sprocket 55 which is splined on the shaft 52, and the endless chain 57 connecting these sprockets 55 and 56 together. A parking gear 59 surrounds the outside of the cylinder 50 of the servo C-3 for the clutch C3; when the shift lever of the manual range setting valve 210 is positioned to the "P" or parking position, then a parking claw, not shown, engages therewith and thereby locks the shaft 42.

A valve 60 is provided in the transfer transmission 40 for supplying and/or exhausting hydraulic fluid pressure to/from the pressure chambers of the servo units C-3, C-4, and B-4 for the clutches C3 and C4 and the brake B4; and the reference numeral 61 denotes a sump pan. Hydraulic pressure is supplied to the servo units C-3, C-4, and B-4 via the transmission case 62 and a conduit 64 provided in the casing 48 to the transfer transmission valve 60 of the transfer transmission control device 400.

During normal operation of the vehicle, the servo unit C-3 receives line pressure from the hydraulic control device of the automatic transmission, by the select lever 401 of FIG. 4 being manually positioned by the hand of the driver to an "H2" position, so that the clutch C3 is engaged, while the servo unit B-4 of the brake B4 is drained and the servo unit C-4 of the clutch C4 is drained, thus disengaging these two frictional engaging devices. Thus, in the planetary gear mechanism Pf, the sun gear 44 and the carrier 47 are coupled together, and power is thus transmitted from the shaft 32 to the power output shaft 42 for the rear wheels at a gearing ratio of unity, whence said power is transmitted via the propeller shaft C (see FIG. 1) to the rear wheels of the vehicle. Further, the transfer transmission device 53 is disengaged, and thus no power is transmitted to the front wheels of the vehicle. Thus, as a whole, the vehicle transmission is in the direct two wheel drive operational condition. At this time, the power is being transmitted from the shaft 32, not through the sun gear 44 or the planetary pinions 45 or the ring gear 46, but through the clutch C3 and the carrier 47 only, and hence the gears of the transmission 40 are not being subjected to any wear; thereby, their life is maximized. This is called the "H2" operational mode.

Now, to alter from the two wheel drive operational mode to the four wheel drive operational mode, the select lever 401 is manually moved by the hand of the driver to its "H4" position as indicated in FIG. 4, and this causes a gradual supply of line pressure to the pressure chamber C-4 of the clutch C4, thus gradually engaging said clutch C4. This causes the power output shaft 42 for the rear wheels to be coupled to the sleeve 51, and power is thereby transmitted from said shaft 42, via the sleeve 51 and the sprocket 56, through the endless chain 57, to the sprocket 55 and thence to the power output shaft 52 for the front wheels of the vehicle, whence said power is transmitted via the propeller shaft B (see FIG. 1) to the front wheels of the vehicle. Thus, as a whole, the vehicle transmission is in the direct four wheel drive operational condition. Again, at this time, the power is being transmitted from the shaft 32 through the clutch C3 and the carrier 47 only, not via the planetary gear mechanism Pf, and hence the gears of the transmission 40 are not being subjected to any wear; thereby, their life is maximized. This is called the "H4" operational mode.

Further, when operating in this "H4" operational mode, if it is desired to obtain a higher torque for mounting a hill or pulling through a mud slough or the like, then the select lever 401 of FIG. 4 is manually positioned by the hand of the driver to the "L4" position, so that an inhibitor valve 440, which swaps between the high speed four wheel drive and the low speed four wheel drive conditions, is released to be operable between the above two conditions. Under this condition, as described in more detail hereinunder, if the port 454 of the inhibitor valve 440 is supplied with the line pressure through a passage 1M, the spool 441 is still shifted down as shown in FIG. 4, and the high speed four wheel drive is continued as in the "H4" operational mode. However, if the supply of the line pressure through the passage 1M is interrupted by a solenoid valve S4 being energized so as to open a drain port 600a, the spool 441 is shifted up and the supply of the line pressure to the passage 1P is switched over to the passage 1N, and thereby the clutch C3 is disengaged by smooth and progressive draining of the pressure chamber of its servo unit C-3, while simultaneously the servo unit B-4 of the brake B4 is smoothly and progressively supplied with line pressure, thus swapping over the engagement conditions of these two frictional engaging devices, while the servo unit C-4 of the clutch C4 is maintained as supplied with line pressure. Thereby, the sun gear 44 and the carrier 47 of the planetary gear mechanism Pf are disengaged from one another, while the ring gear 46 is fixed to the casing of the transmission; and thereby power is transmitted from the shaft 32 to the power output shaft 42 for the rear wheels through sun gear 44, the planetary pinions 45, and the ring gear 46 of the planetary gear mechanism Pf at a gearing ratio greater than one, i.e. at a higher gearing ratio than before, and thence via the propeller shaft C (see FIG. 1) to the rear wheels of the vehicle; while said power is also transmitted at said same higher gearing ratio via the transfer transmission device 53 which is engaged and via the propeller shaft B to the front wheels of the vehicle. This is called the "L4" operational mode.

Table 3, which again is given at the end of this specification and before the claims thereof, shows the state of engagement and disengagement of each of the frictional engaging devices C3, C4, and B4, in each of the set operational modes H2, H4, and L4 of the select lever 40. In this table, the symbol "O" denotes engagement, while the symbol "X" denotes disengagement. Further, Table 3 shows the overall speed ratio provided by the transfer transmission unit 40; the ratio is easily calculated by one of skill in the art, where x is the ratio between the number of teeth upon the sun gear 44 and the number of teeth upon the the ring gear 46, using the formula $(1+x)/x$.

The control system 400 for the transfer transmission 40, shown in FIG. 4, comprises the select lever 401 which is provided conveniently for operation by the driver of the vehicle, said select lever 401 being linked by a link mechanism 402 with a transfer manual valve 410 which has a spool element 420. Further, the control system 400 comprises: the aforementioned inhibitor valve 440 for switchover between the two wheel drive direct transmission operational condition, the four wheel drive direct transmission operational condition, and the four wheel drive direct/reduction transmission operational condition; an accumulator control valve 460 between said inhibitor valve 440 and the servo unit C-3 for the clutch C3; an upshift (L4 to H4) timing mechanism 430 comprising an accumulator 490 and a throttling element 480; a transfer automatic control device 500 controlling the input pressure for the inhibitor valve 440 (which is a pressure relating to vehicle speed) to conduit 1M coupled to the conduit 1, so that when the vehicle speed is below a particular determinate value a controller 600 energizes the solenoid valve S4 to open the drain port 600a; and a vehicle speed sensor 501; a throttling element fitted with a check valve 520 provided in the passage 1N for the servo unit B-4 of the clutch B4; a throttling element fitted with a check valve 530 provided in the passage 7 for the servo unit C-4 of the clutch C4; and a throttling element fitted with a check valve 530 provided in the passage 1P connecting the inhibitor valve 440 and the timing mechanism 430.

The spool element 402 of the transfer manual valve 410 is coupled via the link mechanism 402 with the select lever 401 which is accessible by the driver seated in the driver seat, and has: a port 411 which is connected to the line pressure conduit 1 of the hydraulic control system for the four speed transmission 10; a port 413 which is connected to a conduit 6, an out port 415 which is connected to a conduit 7, and drain ports 417 and 419. In the H2 position for two wheel drive, the spool element 420 communicates the conduits 1 and 6 together, while the conduit 7 is communicated to the drain port 419 and is drained; in the H4 position for high speed four wheel drive, said spool element 420 communicates the conduits 1 and 6 and 7 together; and, in the L4 position for high/low speed four wheel drive, said spool element 420 communicates the conduits 1 and 7 together, while the conduit 6 is communicated to the drain port 417 and is drained.

The inhibitor valve 440 has the spool element 441 which is biased upwards in the figure by a spring 450 mounted in a bottom chamber 457 open to a drain port 458, and a plunger 442 is fitted in series with the spool element 441. This spool element 441 has: a sleeve shaped land 445 formed with a port 443 at its lower end in the figure, on which said spring 450 bears; a top land 447; and a middle land 446. The plunger 442 has a bottom land 448 of greater diameter than the lands of the spool element 441, and also has a top land 449 of greater diameter than its said bottom land 448. Thus, the spool element 441 and the plunger 442 together define: first and second intermediate chambers 452 and 453 between the lands 445, 446, and 447; a chamber 454 between the lands 447 and 448; and an upper hydraulic fluid chamber 456.

The accumulator control valve 460 has a spool element 471 which is biased upwards in the figure by a spring 470. This spool element 471, further, has a bottom land 473, an intermediate land 475, and a top land 477 which is somewhat larger in diameter than the lands 473 and 475. Thereby, there are defined a lower chamber 461, intermediate chambers 463 and 465, and an upper chamber 467. The chamber 463 is permanently connected to the conduit 1Q which leads to the servo C-3 for the clutch C3, while the chamber 465 is permanently connected to the line pressure conduit 1; the chamber 467 receives the fed back pressure in the conduit 1Q, while the chamber 461 is supplied pressure from the conduit 1R which connects to the line 1Q via a throttling element 480 and an accumulator 490.

The automatic control mechanism 500 for the transfer transmission 500 comprises: the vehicle speed sensor 501, which provides an input to the speed change control device 600 which will be explained hereinafter, and the solenoid valve S4 which is controlled to be either ON or OFF by said speed change control device 600 to selectively drain the passage 1M at the downstream side of an orifice 511 so as to modify the pressure in the passage 1M. When the vehicle road speed is higher than a determinate speed value, for example 20 km/h, then the solenoid valve S4 is turned OFF by the control device 600, and line pressure from the conduit 1 is present in the conduit 1M; but, on the other hand, when the vehicle road speed is lower than said determinate speed value of exemplarily 20 km/h, then the solenoid valve S4 is turned ON by the control device 600, and the conduit 1M is drained. Thus, the pressure in said conduit 1M depends upon the vehicle speed. The solenoid ON/OFF setting can be easily changed in the speed change control device 600 based upon the input from the vehicle speed sensor 501, so it is easy for the driver to change, depending upon the current road conditions.

Now, the operation of the transfer transmission 40 in each of its ranges will be explained.

First, when the transfer manual valve 410 is set to the "H2" range, then the conduit 7 is drained, so the pressure chamber of the servo unit C-4 of the clutch C4 is drained, and no rotational power is transmitted through said clutch C4 to the sleeve 51, and the transfer transmission 40 stays in the two wheel drive state. At this time, line pressure is supplied to the conduit 6, so that the spool element 441 and the plunger 442 of the inhibitor valve 440 are at their lower positions as seen in the figure, and the conduit 1N is communicated to the port 459 and is drained, so the pressure chamber of the servo unit B-4 of the brake B4 is drained. Further, the conduit 1P is connected to the line pressure conduit 1, and via the throttling element and check valve 540 and the accumulator control valve 460 to the conduit 1Q, so that pressure is supplied to the pressure chamber of the servo unit C-3 of the clutch C3, which accordingly is engaged. Accordingly, the transfer transmission 40 is set to its directly connected condition in which only the power output shaft 42 which leads to the rear wheels is powered, i.e. to its "H2" or two wheel drive direct connection operational condition.

Next, when the transfer manual valve 410 is set to the "H4" range, then the conduit 7 is also supplied with line pressure, so the pressure chamber of the servo unit C-4 of the clutch C4 is pressurized, and this clutch C4 is thereby engaged to transmit rotational power to the sleeve 51, and the transfer transmission 40 is thereby put into the four wheel drive state. At this time, as before, line pressure is supplied to the conduit 6, so that the spool element 441 and the plunger 442 of the inhibitor valve 440 are at their lower positions as seen in the figure, and the conduit 1N communicated to the port 459 is drained, so the pressure chamber of the servo unit B-4 of the brake B4 is drained; on the other hand the conduit 1P is connected to the line pressure conduit 1, and via the throttling element and check valve 540 and the accumulator control valve 460 to the conduit 1Q, so that pressure is supplied to the pressure chamber of the servo unit C-3 of the clutch C3, which accordingly is engaged. Accordingly, the transfer transmission 40 is set to its directly connected condition in which both the power output shaft 42 which leads to the rear wheels and the power output shaft 52 which leads to the front wheels are powered, i.e. to its "H4" or four wheel drive direct connection operational condition.

Finally, when the transfer manual valve 410 is set to the "L4" range, then as just described above the conduit 7 is supplied with line pressure, so that the pressure chamber of the servo unit C-4 of the clutch C4 is pressurized, and this clutch C4 is thereby engaged to transmit rotational power to the sleeve 51, and the transfer transmission 40 is thereby put into the four wheel drive state. Now, on the other hand, at this time line pressure is no longer supplied to the conduit 6, which is instead drained, so that the spool element 441 and the plunger 442 of the inhibitor valve 440 are allowed to move to their upper positions as viewed in the figure, and the conduit 1N can be pressurized, so the pressure chamber of the servo unit B-4 of the brake B4 is pressurized to engage said brake B4; on the other hand, as opposite to the conduit 1N, the conduit 1P can be drained, so that no pressure is supplied to the pressure chamber of the servo unit C-3 of the clutch C3, which accordingly is disengaged. In this case, the transfer transmission 40 is set to its speed reducing condition in which both the power output shaft 42 which leads to the rear wheels and the power output shaft 52 which leads to the front wheels are powered to four wheel drive speed reducing operational condition.

Now, if the vehicle speed is higher than a certain determinate value, and the solenoid S4 is OFF, then, when the transfer manual valve 410 is set to the "L4" range, line pressure is supplied to the conduit 1M, and the spool element 441 of the inhibitor valve 440 remains held down by the line pressure in the chamber 454.

When the vehicle speed is lower than said certain determinate value, the solenoid S4 is switched ON, and then the conduit 1M is drained, so that the spool element 441 of the inhibitor valve 440 is now moved upwards in the figure by the spring 450, so that the conduits 1 and 1N are communicated together, and thereby line pressure is supplied to the pressure chamber of the servo unit B-4 of the brake B4 and said brake B4 is engaged, while the conduit 1P is connected to the drain port 457 and is drained, whereby the pressure chamber of the servo unit C-3 of the clutch C3 is drained and said clutch C3 is disengaged. Thereby the transfer transmission 40 is set to the low speed four wheel drive operational condition. After once reaching this low speed four wheel drive operational conditon, even if later the vehicle speed rises to be above said certain determinate value, and the solenoid S4 comes to be OFF, the pressure in the line 1M supplied to the port 454 of the inhibitor valve 440 is interrupted by the land 447 of the spool element 441, so that the spool element 441 does not move, and the low speed four wheel drive operational condition is maintained until the manual valve 410 is shifted to the "H4" or the "H2" position, thereby avoiding hunting of the transfer transmission between the direct transmission operational mode and the reducing operational mode.

Figure 5:
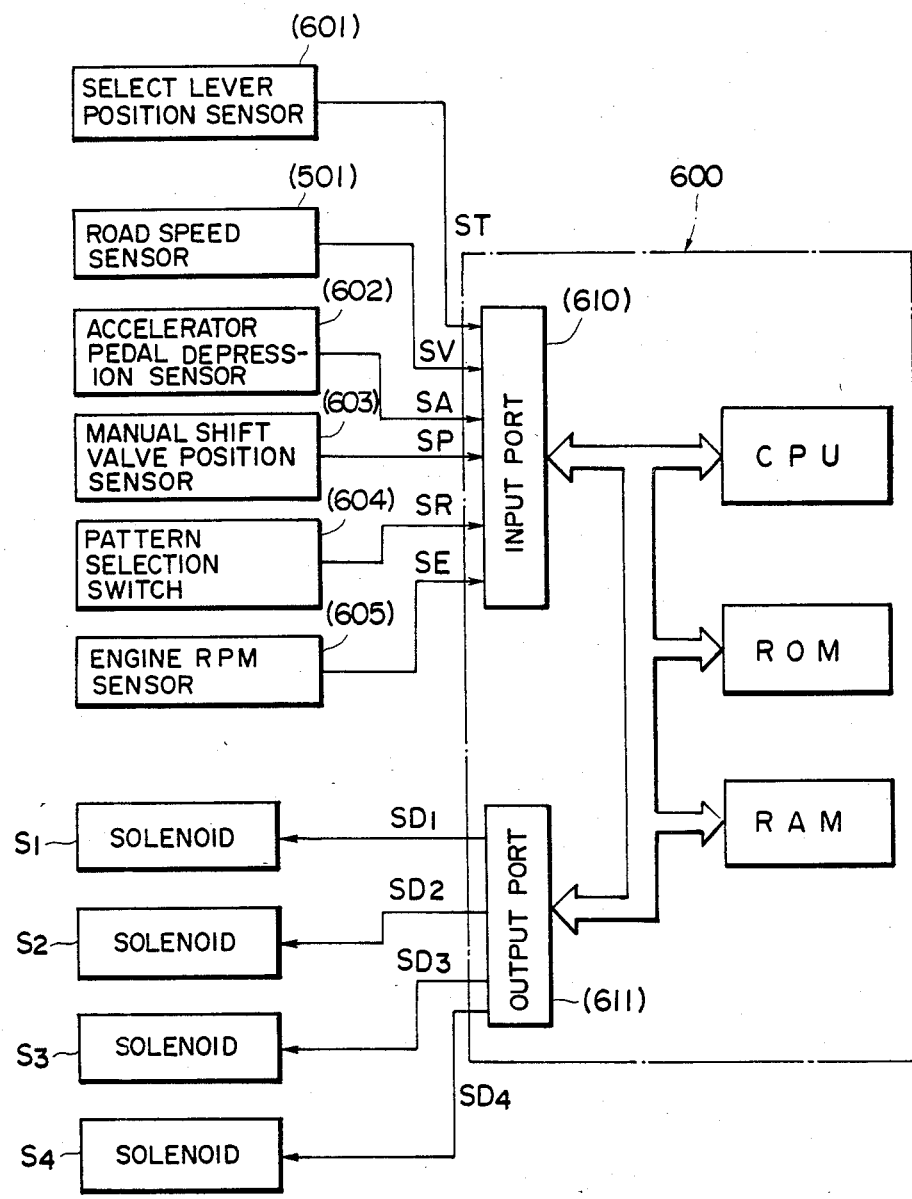
FIG. 5 is a block diagrammatical illustration of the structure of an electrical control system for said transmission, also showing certain sensors thereof.

Now, referring to FIG. 5 which is a block diagram of the electrical control system 600 for the automatic transmission and also shows various sensors and solenoids thereof, the manner in which said electrical control system 600 controls the transmission system described above will be explained. The electrical control system 600 comprises a microcomputer of a per se known sort, which has an input port 610 and on output port 611, and also has a CPU, a ROM, a RAM, and so on, all interconnected by a bus. The output port 611, according to commands supplied thereto by the CPU, provides electrical output signals SD1 through SD4 for controlling the four solenoids S1 through S4 mentioned previously; and the input port 610 receives the following signals from the following sensors and transmits to the CPU values representative of their values: a select lever position signal ST from a select lever position sensor 601 which detects the position of the select lever 401 of the transfer transmission 40; a vehicle road speed signal SV from a vehicle road speed sensor 501 which detects a parameter representative of the vehicle road speed; an accelerator pedal depression signal SA from an accelerator pedal depression sensor 602, which detects the amount of depression of the accelerator pedal of the vehicle (which is taken as a parameter representative of load on the engine E of the vehicle); a manual shift valve position signal SP from a manual shift valve position sensor 603, which detects the position of the manual range setting valve 210 of the main transmission unit; a shift pattern signal SR from a shift pattern selection switch 604, which is manually operable by the vehicle driver for selecting between shift patterns such as "economy driving", "normal driving", "power driving", and so on; and an engine revolution speed signal SE from an engine revolution speed sensor 605. And the ROM holds data representative of a two wheel drive (E) speed change pattern and a two wheel drive (E) lock up clutch operational pattern (see FIG. 7), and of a four wheel drive (P) speed change pattern and a four wheel drive (P) lock up clutch operational pattern (see FIG. 8).

Figure 6:
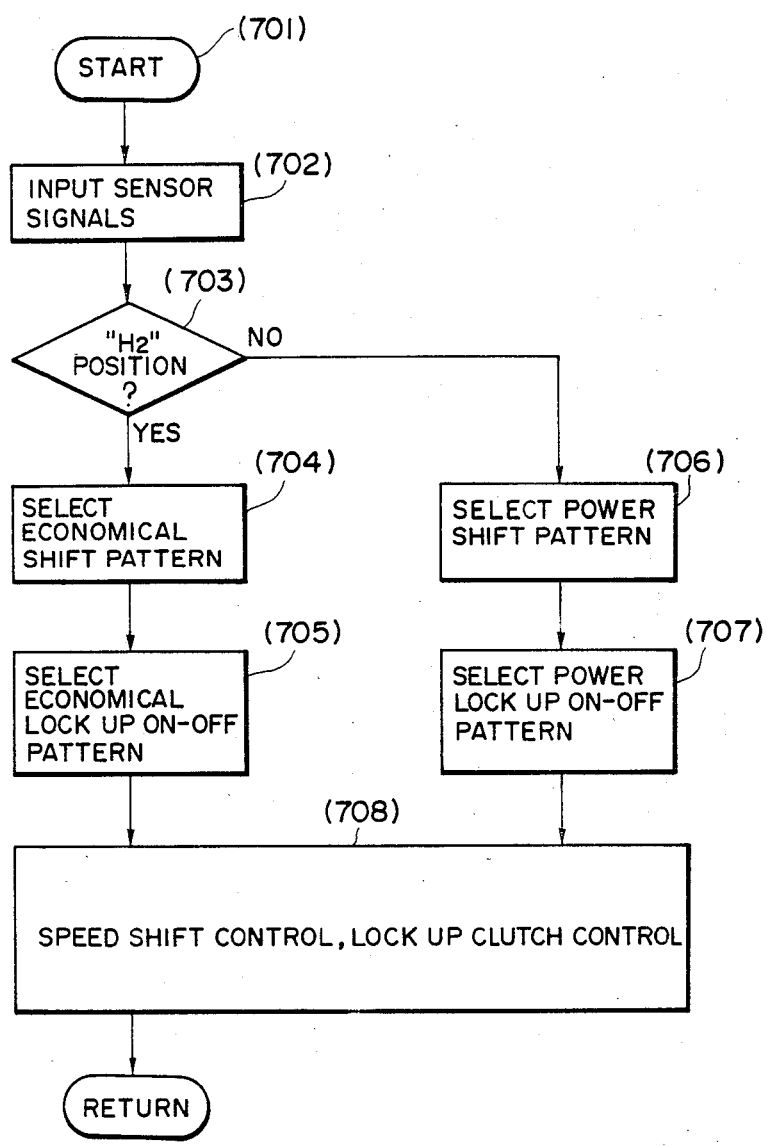
FIG. 6 is a flow chart of the operation of a microcomputer incorporated in said electrical control system for said transmission.

Now, with reference to the flow chart shown in FIG. 6, the operation of this electrical control system will be explained, insofar as it need be understood in order to comprehend the principle of the present invention. At the START block (701) the engine of the vehicle is started by turning the ignition switch on, and the program starts. Next, in the (702) block, the CPU, under control of the program, inputs data from its various sensors detailed above. Next, in the (703) decision block, the flow of control branches according as to whether or not the signal ST from the select lever position sensor 601 indicates an "H2" position of the select lever 401 of the transfer transmission 40, or not; if the select lever 401 is set to the "H2" position, then the flow of control passes to the block (704), wherein an economical shift pattern is selected for the main transmission, and then to the block (705) wherein a corresponding economical on-off pattern is selected for the lock up clutch, both patterns being designed to be suitable to the two wheel driving operational condition of the vehicle.

On the other hand, if the select lever is not set to the "H2" position, that is, if the select lever is set to the "H4" position or the "4" position, then the flow of control passes to the block (706) wherein a power shift pattern is selected for the main transmission, and then to the block (707) wherein a corresponding power on-off pattern is selected for the lock up clutch, both patterns being designed to be suitable to the four wheel drive operational condition of the vehicle.

In either case, next the flow of control passes to the block (708), wherein the on-off control of the lock up clutch and the speed shift changes of the main transmission are performed in a manner which may be one of various control manners already per se known in the automatic transmission art.

Figure 7:
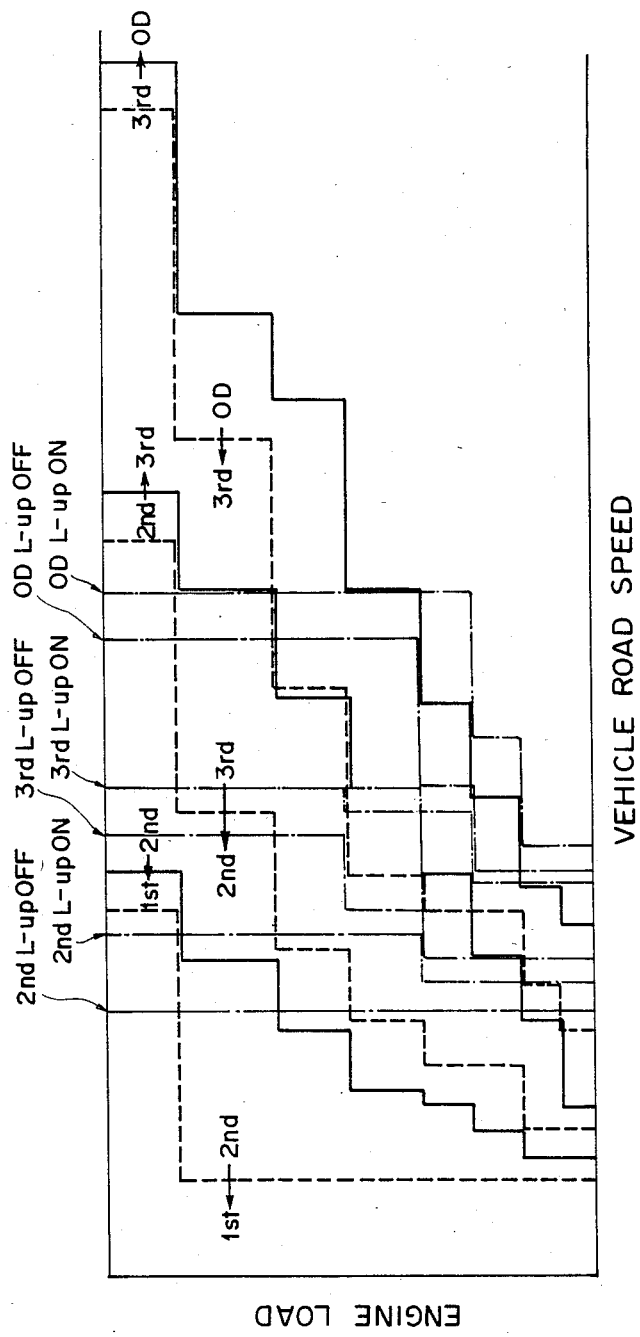
FIG. 7 is a shift diagram, showing a two wheel drive shift pattern and a two wheel drive lock up clutch operational pattern for a lock up clutch.
Figure 8:
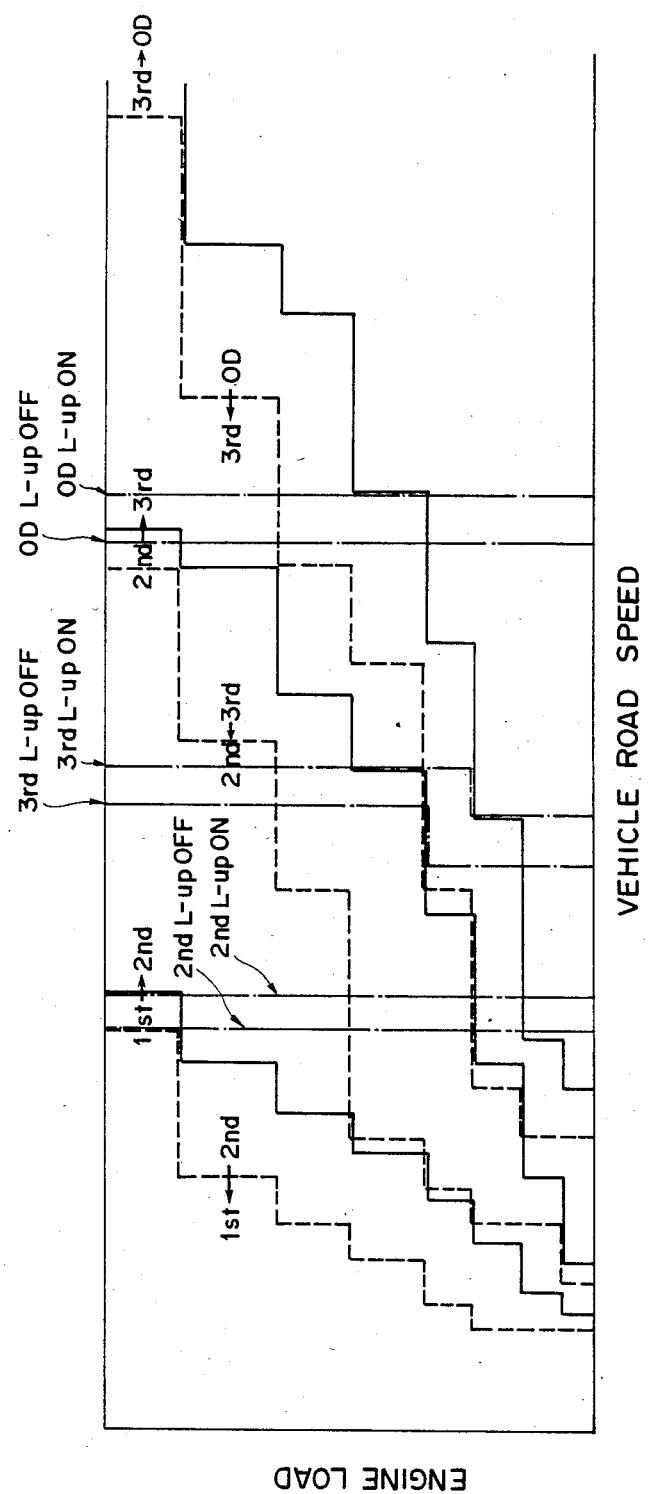
FIG. 8 is a shift diagram, similar to FIG. 7, showing a four wheel drive shift pattern and a four wheel drive lock up clutch operational pattern for said lock up clutch.

Thus, in particular, according to the present invention, it is seen that the operation of the electrical control system 600 uses data corresponding to either the shift and lock up clutch operating diagrams of FIG. 7, or the shift and lock up clutch operating diagrams of FIG. 8, according as the transfer transmission 40 is being operated in the two wheel drive or the four wheel drive operational mode. This means that, when the transfer transmission is set to the two wheel drive mode, the operational characteristics of the main transmission are different from those used when the transfer transmission is set to the four wheel drive operational mode; and thereby optimal operation of said main transmission is provided so that the emphasis is put either on the economy of fuel or on maximizing the power characteristics of the vehicle. By the speed change data and/or the lock-up clutch engagement data being made to be dependent on the setting of the transfer transmission, thereby there is automatically provided a capability for selection between a plurality of speed stages according to selected operational parameters of the vehicle while allowing switching over of driving between the two wheel driving operational condition and the four wheel drive operational condition and while satisfying the requirement for balance between pursuit of economy of fuel and pursuit of high power, and while also allowing an optional design of the shift patterns of the transmission for providing maximum drivability of the vehicle.

Although the present invention has been shown and described with reference to the preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. For instance, although a select lever is used in the embodiment shown and described, in fact this is not essential, and a select switch or a select button could be used instead. Other variations also could be utilized. Therefore it is desired that the scope of the present invention, and of the protection sought to be granted by Letters Patent, should be defined not by any of the perhaps purely fortuitous details of the shown preferred embodiment, or of the drawings, but solely by the scope of the appended claims, which follow.

TABLE 1

| TRANSMISSION RANGE/SPEED | CLUTCHES C0-C1-C2 | BRAKES B0-B1-B2-B3 | ONE-WAY CLUTCHES F0-F1-F2 |
|---|---|---|---|
| P | O-X-X | X-X-X-X | |
| R | O-X-O | X-X-X-O | L-F-F |
| N | O-X-X | X-X-X-X | |
| D 1 | O-O-X | X-X-X-X | L-F-L |
| 2 | O-O-X | X-X-O-X | L-L-F |
| 3 | O-O-O | X-X-O-X | L-F-F |
| 4 | X-O-O | O-X-O-X | F-F-F |
| S 1 | O-O-X | X-X-X-X | L-F-L |
| 2 | O-O-X | X-O-O-X | L-L-F |
| 3 | O-O-O | X-X-O-X | L-F-F |
| L 1 | O-O-X | X-X-X-O | L-F-L |
| 2 | O-O-X | X-O-O-X | L-L-F |

TABLE 2

| | P | R | N | D | S | L |
|---|---|---|---|---|---|---|
| CONDUIT 2 | X | X | X | O | O | O |
| CONDUIT 3 | X | X | X | X | O | O |
| CONDUIT 4 | X | X | X | X | X | O |
| CONDUIT 5 | X | O | X | X | X | X |

TABLE 3

| POSITION OF LEVER 401 | ENGAGEMENT CONDITIONS | | | SPEED RATIO |
|---|---|---|---|---|
| | C3 | B4 | C4 | |
| H2 (direct two wheel drive mode) | O | X | X | 1 |
| H4 (direct four wheel drive mode) | O | X | O | 1 |
| L4 (direct four wheel drive mode) | O | X | O | 1 |
| L4 (reduction four wheel drive mode) | X | O | O | 3.0 |

What is claimed is:

1. For a transmission system, for a vehicle with at least four wheels, comprising a main transmission system which can be set to any one of a plurality of speed stages, and a transfer transmission system which receives power from said main transmission system and can be selectively set either to a two wheel drive operational mode in which it provides transmission of power only to two wheels of said vehicle or to a four wheel drive operational mode in which it provides transmission of power to four wheels of said vehicle:

a transmission control system, comprising:
(a) a means for detecting at least one parameter representing the operational condition of the vehicle;
(b) a means for determining the operational mode of said transfer transmission system between said two wheel drive operational mode and said four wheel driver operational mode;
and
(c) a means for setting said main transmission system to selected ones of said plurality of speed stages thereof according to said parameter representing the operational condition of the vehicle as detected by said detecting means therefor, and according to the operational mode of said transfer transmission system as determined by said determining means therefor, a pattern of shifting between said plurality of speed stages of said main transmission system as said parameter varies varying according as said transfer transmission system is set to said two wheel drive operational mode or said four wheel drive operational mode.

2. A transmission control system according to claim 1, wherein said parameter representing the operational condition of the vehicle is engine load.

3. A transmission control system according to claim 1, wherein said parameter representing the operational condition of the vehicle is vehicle road speed.

4. A transmission control system according to claim 1, wherein said parameter representing the operational condition of the vehicle is the combination of engine load and vehicle road speed.

5. A transmission control system according to claim 1, wherein said vehicle comprises a manual switchover device which controls said transfer transmission system either to provide transmission of power only to said two wheels of said vehicle or to provide transmission of power to said four wheels of said vehicle, and wherein said means for determining the operational mode of said transfer transmission system detects the set position of said manual switchover device.

6. A transmission control system according to claim 1, wherein said pattern of shifting between said plurality of speed stages of said main transmission system as represented on a coordinate system of vehicle road speed versus engine load is shifted towards a lower vehicle road speed region for the same engine load in the two wheel drive operational mode of said transfer transmission system than in the four wheel drive operational mode of said transfer transmission system.

7. A transmission control system according to claim 1, wherein said transfer transmission system can be set to either a direct transmission stage or a speed reducing transmission stage, and further comprising a means for setting said transfer transmission system to either of said direct and said speed reducing transmission stages thereof according to a parameter representing the operational condition of the vehicle as detected by said detecting means when and only when said transfer transmission system is set to said four wheel drive operational mode.

8. For a transmission system, for a vehicle with at least four wheels, comprising a main transmission system which can be set to any one of a plurality of speed stages and including a torque converter and a lock up clutch which selectively can lock up said torque converter, and a transfer transmission system which receives power from said main transmission system and can be selectively set either to a two wheel driver operational mode in which it provides transmission of power only to two wheels of said vehicle or to a four wheel drive operational mode in which it provides transmission of power to four wheels of said vehicle:

a transmission control system, comprising:
  (a) a means for detecting at least one parameter representing the operational condition of the vehicle;
  (b) a means for determining the operational mode of said transfer transmission system between said two wheel drive operational mode and said four wheel drive operational mode;
and
  (c) a means for setting said main transmission system to selected ones of said plurality of speed stages thereof, and for either locking up said torque converter or not, according to said parameter representing the operational condition of the vehicle as detected by said detecting means therefor, and according to the operational mode of said transfer transmission system as determined by said determining means therefor, the pattern of shifting between said plurality of speed stages of said main transmission system and of torque converter locking up as said parameter varies varying according as said transfer transmission system is set to said two wheel drive operational mode or said four wheel drive operational mode.

9. A transmission control system according to claim 8, wherein said parameter representing the operational condition of the vehicle is engine load.

10. A transmission control system according to claim 8, wherein said parameter representing the operational condition of the vehicle is road speed.

11. A transmission control system according to claim 8, wherein said parameter representing the operational condition of the vehicle is the combination of engine load and road speed.

12. A transmission control system according to claim 8, wherein said pattern of shifting between said plurality of speed stages of said main transmission system and said pattern of lock up clutch operation, as represented on a coordinate system of vehicle road speed versus engine load, are shifted towards a lower vehicle road speed region for the same engine load in the two wheel driver operational mode of said transfer transmission system than in the four wheel drive operational mode of said transfer transmission system.

13. A transmission control system according to claim 8, wherein said transfer transmission system can be set to either a direct transmission stage or a speed reducing transmission stage, and further comprising a means for setting said transfer transmission system to either of said direct and said speed reducing transmission stages thereof according to a parameter representing the operational condition of the vehicle as detected by said detecting means when and only when said transfer transmission system is set to said four wheel drive operational mode.

* * * * *